(12) United States Patent
Valkier et al.

(10) Patent No.: US 11,091,620 B2
(45) Date of Patent: Aug. 17, 2021

(54) THERMOPLASTIC COMPOSITION

(71) Applicant: SABIC GLOBAL TECHNOLOGIES B.V., Bergen Op Zoom (NL)

(72) Inventors: Pieter Valkier, Geleen (NL); Dimphna Johanna Maria Van Beek, Geleen (NL); Gerard Jan Eduard Biemond, Geleen (NL); Rob Donners, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 74 days.

(21) Appl. No.: 16/448,690

(22) Filed: Jun. 21, 2019

(65) Prior Publication Data

US 2019/0315955 A1  Oct. 17, 2019

Related U.S. Application Data

(63) Continuation-in-part of application No. PCT/EP2017/083588, filed on Dec. 19, 2017.

(30) Foreign Application Priority Data

Dec. 23, 2016 (EP) .................................. 16206562

(51) Int. Cl.
*C08L 23/16* (2006.01)
(52) U.S. Cl.
CPC ......... *C08L 23/16* (2013.01); *C08L 2205/025* (2013.01); *C08L 2205/03* (2013.01)
(58) Field of Classification Search
CPC .................................................... C08L 23/16
See application file for complete search history.

(56) References Cited

U.S. PATENT DOCUMENTS

2016/0326355 A1* 11/2016 Marques Ferreira Custodio ........
                                                    C08L 23/12

FOREIGN PATENT DOCUMENTS

| EP | 2495280 A1 | 9/2012 |
|---|---|---|
| WO | 2015091151 A1 | 6/2015 |
| WO | 2015091372 A1 | 6/2015 |
| WO | 2015091810 A1 | 6/2015 |

OTHER PUBLICATIONS

International Preliminary Report on Patentability; International Application No. PCT/EP2017/083588; International Filing Date: Dec. 19, 2017; 10 pages.
International Search Report; International Application No. PCT/EP2017/083588; International Filing Date: Dec. 19, 2017; dated Mar. 9, 2018; 4 pages.
Soares et al. "Polyolefin Reaction Engineering" First Edition, Jul. 2012, pp. 271-309.
VDA 278 "Thermal Desorption Analysis of Organic Emissions for the Characterization of Non-Metallic Materials for Automobiles", Oct. 2011, pp. 1-19.
Written Opinion; International Application No. PCT/EP2017/083588; International Filing Date: Dec. 19, 2017; dated Mar. 9, 2018; 9 pages.

* cited by examiner

*Primary Examiner* — Arrie L Reuther
(74) *Attorney, Agent, or Firm* — Cantor Colburn LLP

(57) ABSTRACT

The present invention relates to a thermoplastic composition, e.g., for automotive parts, comprising: (A) from 10 to 69 wt. % polypropylene(s); (B) at least 30 wt. % heterophasic propylene copolymer comprising: from 70 to 92 wt. % a propylene-based matrix consisting of a polypropylene, wherein the propylene polymer has an intrinsic viscosity $IV_{PP}$; from 8 to 30 wt. % dispersed ethylene-α-olefin copolymer having an ethylene content of between 10 and 55 wt and an intrinsic viscosity $IV_{EPR}$; and wherein the ratio of $IV_{EPR}/IV_{PP}$ is between 3 and 7; C) from 0-30 wt. % ethylene-α-olefin elastomer comprising ethylene and a C3 to C10 α-olefin; D) from 1 up to 30 wt. % talc as a filler; E) from 0-10 wt. % high-density polyethylene (HDPE); and F) from 0-3 wt. % additional additives.

19 Claims, No Drawings

THERMOPLASTIC COMPOSITION

The present application is a continuation-in-part of International Application No. PCT/EP2017/083588, filed Dec. 19, 2017, which is incorporated by reference in its entirety, and which claims priority to European Application Serial No. 16206562.7, filed Dec. 23, 2016.

The present invention relates to a thermoplastic composition. Moreover, the present invention relates to the use of said composition for the manufacture of a part in automotive applications, such as an exterior, semi-exterior, or interior automotive part, preferably an automotive bumper fascia, a cowl top, instrument panel, pillar trim or door panel. Preferably, the invention relates to unpainted automotive parts. Preferably, the invention relates to visible automotive parts. The present invention further relates to a method for the manufacture of the automotive part.

In the automotive industry polypropylene based materials are often used for their desirable combination of good mechanical properties and low cost. In particular so called impact propylene copolymers are often used in applications like bumper fascia, cowl tops, instrument panels, pillar trims and door panels. The requirements for automotive applications include low Coefficient of Linear Thermal Expansion (CLTE), good impact strength, good stiffness, scratch resistance and good optical surface properties. In order to obtain a low CLTE together with the desired mechanical properties the polypropylene based materials usually contain a certain amount of inorganic filler, such as in particular talc.

The addition of talc, however, is known to deteriorate the optical surface properties. In particular it increases the risk for so called "tiger stripes (TS)". Tiger stripes as used herein refers to color and gloss variations on the surface of an injection molded article, which occurs because of unstable mold filling properties of the molten polymer as it is being injected into the mold and formed into the desired shape. Usually these variations can be observed as alternating areas of low and high gloss and/or light or darker color, wherein the areas usually are substantially perpendicular to the flow direction of an injection molded article. Tiger stripes may also be referred to as tiger marks or tiger (flow) markings. Tiger stripes typically occur in polypropylene based materials containing polypropylene, a rubber dispersed in the polypropylene and an inorganic filler, in particular talc. Tiger stripes are undesirable in automotive applications, in particular in case where the polypropylene based material is not provided with an additional layer such as paint or a laminating layer.

A heterophasic propylene copolymer is known for use in various fields such as automobile articles due to its good mechanical properties such as impact strength. WO 2015/091810 is directed to a heterophasic propylene copolymer comprising a matrix phase comprising a propylene polymer and a dispersed phase comprising an ethylene-α-olefin elastomer comprising ethylene and an α-olefin.

Accordingly, it is an object of the invention to provide a material for typical use in an automotive part, especially a bumper fascia, a cowl top, an instrument panel or pillar trim or door panel, having good mechanical properties, good processability in combination with good esthetic properties, for example good tiger stripe behavior. It is a further object of the present invention to provide a thermoplastic material having a desired combination of mechanical properties that is inter alia suitable for the manufacture of automotive parts. The present inventors surprisingly found that one or more of these objects can be met by a specifically defined reinforced composition.

Definitions

"Exterior automotive part" as used in the present description means an automotive part that is present on the exterior part of a vehicle, for example a bumper.

"bumper" as used in the present description means a structure that is attached to or integrated in the front and rear of a vehicle intended to absorb impact in a (minor) collision; the structure usually consists of a cover of fascia—to which the present invention is related—over a reinforcement bar, e.g. made of metal or composite. When in the present invention bumper is cited, bumper fascia is meant.

"semi-exterior automotive part" as used in the present description means an automotive part that is present on, or connects to, both the exterior and the interior part of a vehicle, for example a cowl top.

"Cowl top" as used in the present description means the front part of the vehicle's frame that supports the rear of the hood, windshield, dashboard, pedals and instrument panel. The cowl or cowl top separates the passenger compartment from the engine.

"Interior automotive part" as used in the present description means an automotive part that is present in the interior of a vehicle, for example an instrument panel or pillar trim or a door panel.

"Instrument panel" as used in the present description means the dashboard of a vehicle, being a control panel located directly in front of a vehicle's driver, displaying instrumentation and controls for the vehicle's operation.

"Pillar trim" as used in the present description means the (decorative) molding of the pillars of a vehicle, which are the vertical or near vertical supports of a vehicle's window area.

"Door panel" as used in the present description means (decorative) panels on the inside surface of a door of a vehicle.

"Vehicle" as used in the present description means any motorized means of transport having at least 4 wheels, including cars, vans, busses, trucks etc.

"VOC" as used in the present description means: Volatile Organic Compounds having a boiling point of ≥50° C. and <260° C. and also including Very Volatile Organic Compounds (VVOC) having a boiling point of <50° C. This is measured in units of microgram per gram sample according to VDA 278 "*Thermal Desorption Analysis of Organic Emissions for the Characterization of Non-Metallic Materials for Automobiles*", October 2011, 180° C., 30 min on the granulated compounds or on injection molded plaques. Injection molded plaques are stored in airtight bags at a maximum temperature of 23° C.

"SVOC" as used in the present description means: Semi Volatile Organic Compounds having a boiling point of 260° C. and <400° C. This is measured in units of microgram per gram sample according to VDA 278 "*Thermal Desorption Analysis of Organic Emissions for the Characterization of Non-Metallic Materials for Automobiles*", October 2011, 180° C., 30 min on the granulated compounds or on injection molded plaques. Injection molded plaques are stored in airtight bags at a maximum temperature of 23° C.

"FOG" as used in the present description means: the sum of VOC and SVOC. This is measured in units of microgram per gram sample according to VDA 278 "*Thermal Desorption Analysis of Organic Emissions for the Characterization of Non-Metallic Materials for Automobiles*", October 2011, first heating 90° C., 30 min, second heating 120° C., 1 hour on the granulated compounds or on injection molded plaques. Injection molded plaques are stored in airtight bags at a maximum temperature of 23° C.

"Thermoplastic composition" as used in the present description means a composition comprising at least one thermoplastic polymer.

"Polymer" as used in the present description includes homopolymers and all types of copolymers.

"Heterophasic propylene copolymer" as used in the present description means a copolymer having at least a two-phase structure, consisting of a propylene-based (semi-crystalline) matrix and a dispersed ethylene-α-olefin copolymer forming the rubber phase. These heterophasic polypropylenes are generally prepared in a series of reactors, by polymerization of propylene in the presence of a catalyst system, and subsequent polymerization of a propylene-α-olefin mixture. However, they may also be made by blending different (co)polymers. Heterophasic propylene copolymers are sometimes referred to as impact copolymers since one of the advantages of heterophasic polypropylene is improved impact resistance, especially at lower temperatures.

"Propylene-based matrix" as used in the present description means a composition consisting of one or more polypropylenes. For the avoidance of doubt it should be understood that the propylene-based matrix essentially consists of said one or more polypropylenes and does not contain any other materials in an amount more than 2 wt. %. Or, said in another way, the propylene-based matrix consists of at least 98 wt. %, preferably at least 99 wt. % of one or more polypropylenes. It may be propylene homopolymers or propylene copolymers.

"Ethylene α-olefin copolymer" as used in the present description means a copolymer that is prepared from ethylene and at least one other α-olefin monomer having from 3 to 10 carbon atoms (C3-C10 α-olefin monomer) that forms the dispersed phase within the propylene-based matrix phase. The ethylene α-olefin copolymer forms the rubber content (RC) of the heterophasic propylene copolymer.

"Ethylene α-olefin elastomer" as used in the present description means an additional elastomer that might be present in the composition. Such ethylene α-olefin elastomers are sometimes also referred to as plastomers. It is not the same as the ethylene α-olefin copolymer present in the heterophasic propylene copolymer. The elastomer is prepared from ethylene and at least one other C3-C10 α-olefin monomer.

"HDPE" as used in the present description means a polyethylene having a density of between 935 and 970 kg/m$^3$.

"High aspect ratio (HAR) talc" as used in the present description means a talc having a high aspect ratio, such as talc having a lamellarity of at least 2.8.

"Aspect ratio" as used in the present description means a ratio of the smallest diameter of a talc particle over the largest diameter of a talc particle orthogonal to the smallest diameter. The aspect ratio approaches zero for a very elongated particle (that is the particle has a high aspect ratio) and is 1 for a perfectly round particle.

"Tiger stripes" as used in the present invention means a visual defect on the surface of the objects, whereby a(n) (alternating) pattern of light and dark stripes can be observed. Tiger stripes are measured using the method described herein.

SUMMARY

The present invention relates in a first aspect to a thermoplastic composition as disclosed in claim 1. The present invention thus relates to a composition comprising several (optional) components.

Thermoplastic Composition

The composition according to the present invention comprises the following components that will each be discussed in detail below: (A) one or more polypropylenes; (B) a heterophasic propylene copolymer (HPC-D); C) optionally an ethylene-α-olefin elastomer; D) talc as a filler; E) optionally a high-density polyethylene (HDPE); F) optionally one or more additives.

One or More Propylenes (Component (A))

In case the composition comprises two grades of heterophasic propylene copolymer each preferably have distinct and different characteristics, allowing mechanical and melt flow properties to be balanced with good tiger stripe performance. In the embodiment wherein the composition comprises two types of heterophasic propylene composition, for example the melt flow index of the first polypropylene and the second polypropylene may be the same or different. For the purpose of the present invention the combined amount of polypropylene-based matrix and dispersed ethylene-α-olefin copolymer in the heterophasic propylene copolymer is 100 wt. % based on the weight of the heterophasic propylene copolymer. In other words, preferably in addition to the polypropylene and ethylene-α-olefin copolymer no other materials are comprised in the heterophasic propylene copolymer except for an optional small amount of stabilizers and/or additives common in the art.

Component (A) of the composition is present from 10 to 69 wt. %, preferably from 15 to 65 wt. %, more preferably from 20 to 60 wt. % based on the weight of said composition. Component (A) comprises one or more polypropylenes, preferably selected from propylene homopolymers, propylene copolymers or heterophasic propylene copolymers; more preferably said polypropylene(s) having a flexural modulus of more than 800 megaPascals (MPa).

Component (B) of the composition is present in an amount of at least 30 wt. %, in an embodiment at least 31 wt. %, in an embodiment 32 wt. %, in an embodiment at least 33 wt. %, in an embodiment at least 34 wt. %, in an embodiment at least 35 wt. %, such as at least 40 wt. %, based on the weight of said composition. In an embodiment, component (B) of the composition is present in an amount of at most 65 wt. %, such as at most 50 wt. % based on the weight of said composition.

Component (B) comprises a heterophasic propylene copolymer comprising: *from 70 to 92 wt. % based on the weight of said heterophasic propylene copolymer of a propylene-based matrix consisting of a polypropylene, e.g., having a melt flow index of at least 150 g/10 min; and wherein the propylene polymer has an intrinsic viscosity $IV_{PP}$, *from 8 to 30 wt. % based on the weight of said heterophasic propylene copolymer of a dispersed ethylene-α-olefin copolymer having an ethylene content of between 10 and 55 wt. % based on the weight of the ethylene-α-olefin copolymer and wherein the ethylene-α-olefin copolymer has an intrinsic viscosity $IV_{EPR}$; and wherein the ratio of $IV_{EPR}/IV_{PP}$ is between 3 and 7, preferably between 3 and 5.

The present inventors have observed that if a composition comprises a sufficient amount (at least 30 wt. %, preferably more than 30 wt. %) of a heterophasic propolyene having a sufficiently high ratio of $IV_{EPR}/IV_{PP}$, being between 3 and 7, tiger stripes are minimized.

Component (C) of the composition is optional and is present from 0-30 wt. %, preferably from 0-20 wt. %, based on the weight of the composition. Component (C) comprises an ethylene-α-olefin elastomer comprising ethylene and at least one C3 to C10 α-olefin.

Component (D) of the composition is present from 1 up to 30 wt. %, preferably from more than 5 at up to 30 wt. % based on the weight of the composition. Component (D) is talc and is used as a filler. Any type of talc that is suitable for the use as a filler may be used. When the composition is to be used for interior automotive applications, preferably an ultrafine talc is used. When the composition is to be used for exterior automotive applications, preferably a HAR talc is used.

Component (E) of the composition is optional and is present from 0-10 wt. % based on the weight of the composition of a high-density polyethylene (HDPE). When the composition is to be used for interior automotive applications, preferably the amount of HDPE is between 5 and 10 wt. % based on the weight of the composition. When the composition is to be used for exterior automotive applications, preferably the amount of HDPE is between 0 and 5 wt. % based on the weight of the composition.

Component (F) of the composition is present from 0 to 5 wt. %, preferably from 0.1 wt. % to 5 wt. %, based on the weight of the composition of one or more additives. Preferred examples of additives comprise an antioxidant and/or heat stabilizer and/or a light stabilizer and/or an anti-scratch additive.

In an embodiment, said component (A) is formed—preferably for at least 80 wt. %, more preferably at least 90 wt. %, even more preferably at least 95 wt. % or 99 wt. % or even 100 wt. % of the total weight of said component (A)—of one or more the heterophasic propylene copolymers.

In an embodiment of component (A), said heterophasic propylene copolymer consists of:
  i) a propylene-based matrix consisting of a propylene homopolymer and/or a propylene-α-olefin copolymer, said propylene-α-olefin copolymer consisting of at least 70 wt. %, preferably at least 90 wt. % of propylene and at most 30 wt. %, preferably at most 10 wt. % of α-olefin, based on the total weight of the propylene-α-olefin copolymer, wherein the propylene-based matrix is present in an amount of 60 to 95 wt. % based on the total weight of the heterophasic propylene copolymer; and
  ii) a dispersed ethylene-α-olefin copolymer comprising ethylene and at least one C3 to C10 α-olefin; wherein the dispersed ethylene-α-olefin copolymer is present in an amount of 40 to 5 wt. % based on the total weight of the heterophasic propylene copolymer, and
  wherein the sum of the total amount of propylene-based matrix and total amount of the dispersed ethylene-α-olefin copolymer in the heterophasic propylene copolymer is 100 wt. %.

In an embodiment of component (A), the amount of ethylene in the ethylene-α-olefin copolymer—forming part of the heterophasic propylene copolymer—is in the range of 20-65 wt. % based on the weight of the ethylene-α-olefin copolymer. The amount of ethylene in the ethylene-α-olefin copolymer may be determined using $^{13}$C NMR as is known to the person skilled in the art. The α-olefin in the ethylene-α-olefin copolymer is chosen from the group of ethylene and C3-C10 α-olefins. Preferably, the α-olefin is chosen from the group of α-olefins having 3 to 8 carbon atoms and any mixtures thereof, preferably the α-olefin in the ethylene-α-olefin copolymer is propylene.

In an embodiment, component (A) of said composition comprises or consists of a heterophasic propylene copolymer (HPC-A) comprising: 1) from 70 to 90 wt. % based on the weight of the heterophasic propylene copolymer of a polypropylene-based matrix consisting of a polypropylene having a melt flow index of from 55 to 85 g/10 min; and 2) from 10 to 45 wt. % based on the weight of the heterophasic propylene copolymer of a dispersed-ethylene-α-olefin copolymer having a melt flow index of from 2.5 to 5.0 g/10 min. More specific embodiments of this embodiment can be found in WO2015/091151 on page 7, line 11 to page 8, line 34; which section is incorporated by reference.

In an embodiment, component (A) of said composition comprises or consists of a heterophasic propylene copolymer (HPC-B) comprising: a) from 60 to 85 wt. % based on the weight of the heterophasic propylene copolymer of a polypropylene-based matrix consisting of a polypropylene having a melt flow index of from 50 to 250 g/10 min, preferably from 50 to 100 g/10 min; and b) from 15 to 40 wt. % based on the weight of the heterophasic propylene copolymer of a dispersed ethylene-α-olefin copolymer having a melt flow index of from 0.050 to 0.30 g/10 min. More specific embodiments of this embodiment can be found in WO2015/091151 on page 9, line 1 to page 10, line 20; which section is incorporated by reference.

In an embodiment, component (A) of said composition comprises or consists of a first and a second heterophasic propylene copolymer (HPC-A&B) in a weight ratio of between 1:1 and 10:1 of A) said first heterophasic propylene copolymer comprising: A1) from 70 to 90 wt. % based on the weight of the first heterophasic propylene copolymer of a first polypropylene-based matrix consisting of a polypropylene having a melt flow index of from 55 to 85 g/10 min; and A2) from 10 to 45 wt. % based on the weight of the first heterophasic propylene copolymer of a first dispersed-ethylene-α-olefin copolymer having a melt flow index of from 2.5 to 5.0 g/10 min; B) said second heterophasic propylene copolymer comprising: B1) from 60 to 85 wt. % based on the weight of the second heterophasic propylene copolymer of a second polypropylene-based matrix consisting of a polypropylene having a melt flow index of from 50 to 250 g/10 min, preferably from 50 to 100 g/10 min; and B2) from 15 to 40 wt. % based on the weight of the second heterophasic propylene copolymer of a second dispersed ethylene-α-olefin copolymer having a melt flow index of from 0.050 to 0.30 g/10 min. More specific embodiments of this embodiment can be found in WO2015/091151 on page 5, line 32 to page 6, line 20 and page 10 line 22 to page 17, line 6; which section is incorporated by reference.

In an embodiment, component (A) of said composition comprises or consists of a heterophasic propylene copolymer, said heterophasic propylene copolymer (HPC-C) having a melt flow rate of at least 40 g/10 min and a FOG value of at most 500 μg/g, at most 400 μg/g, preferably at most 350 μg/g. Preferably, wherein said heterophasic propylene copolymer is obtained by visbreaking of an intermediate heterophasic propylene copolymer in a shifting ratio, which complies with the following formula:

$$0.0011x^2 - 0.011x + 1 \leq \text{shifting ratio} \leq -0.0009x^2 + 0.1963x + 1$$

wherein x stands for the melt flow rate of the final heterophasic propylene copolymer obtained after visbreaking of the intermediate heterophasic propylene copolymer, wherein the shifting ratio is the melt flow rate of the final heterophasic propylene copolymer divided by the melt flow rate of the intermediate heterophasic propylene copolymer.

The component (A) of said composition may also comprise a combination of two or more of the heterophasic propylene copolymers, viz. HPC-A, HPC-B, HPC-A&B, HPC-C and one or more combinations thereof.

Component (B) of the composition is formed by a heterophasic propylene copolymer, said heterophasic propylene copolymer (HPC-D) comprising: i) from 70 to 92 wt. % based on the weight of said heterophasic propylene copolymer of a propylene-based matrix consisting of a polypropylene, e.g., having a melt flow index of at least 150 g/10 min; and wherein the propylene polymer has an intrinsic viscosity $IV_{PP}$; ii) from 8 to 30 wt. % based on the weight of said heterophasic propylene copolymer of a dispersed ethylene-α-olefin copolymer having an ethylene content of between 10 and 55 wt. % based on the weight of the ethylene-α-olefin copolymer and wherein the ethylene-α-olefin copolymer has an intrinsic viscosity $IV_{EPR}$; and wherein the ratio of $IV_{ERR}/IV_{PP}$ is between 3 and 7, preferably between 3 and 5. More information and embodiments related to this embodiment can be found in WO2015/091372 on page 3 line 10 to page 7, line 3; which section is incorporated by reference.

In an embodiment, the composition has a tensile modulus of at least 1100 MPa, preferably at least 1150 MPa, preferably at least 1200 MPa, more preferably at least 1400 MPa, more preferably at least 1600 MPa, 1800 MPa, 2000 MPa or even more preferably at least 2100 MPa. In an embodiment, the combined amount of the polypropylenes of A) and the heterophasic propylene copolymer B) is at least 80 wt. % based on the weight of said composition. This embodiment is preferred when the composition is used for interior automotive parts. In an embodiment, the composition has an Izod impact strength of at least 10 kJ/m$^2$ at 23° C. For exterior applications, the composition preferably an Izod impact strength of at least 35 kJ/m$^2$ at 23° C. In an embodiment, the composition has a flexural modulus of at least 1100 MPa, preferably at least 1150 MPa, preferably of at least 1200 or at least 1300 MPa (or N/mm$^2$), preferably at least 1400 MPa, more preferably at least 1500 MPa even more preferably at least 1800 MPa, further preferred at least 2000 MPa. In an embodiment, the composition has a warpage of at most 1.4, preferably at most 1.2. In an embodiment, the warpage is at least 0.6, preferably at least 0.8. In an embodiment, the composition has a melt flow index between 5 and 70, preferably 10 to 45 g/10 min. In an embodiment, an object formed of the composition has a tiger stripe value of at least 6.5, preferably at least 7 (or at least 7.0), more preferably at least 7.5. This embodiment of the composition is preferably used for unpainted automotive parts. In an embodiment, said automotive part comprises at least 90 wt. %, preferably at least 95 wt. %, more preferably at least 99 wt. % or even 100 wt. % of the composition according to the invention. In other words, said automotive part may consist of said composition.

In another aspect, the invention relates to the use of a composition for the manufacture of a part in automotive applications, preferably selected from the group consisting of a bumper fascia, a cowl top, an instrument panel, a pillar trim and a door panel. In an embodiment, said use is for an unpainted visible automotive part.

In another aspect, the invention relates to an automotive part comprising the composition, preferably selected from the group consisting of a bumper fascia, a cowl top, an instrument panel, a pillar trim and a door panel. In an embodiment, said automotive part has a tiger stripe value of at least 6.5, preferably at least 7.

The present invention relates in another aspect to a method for the manufacture of the automotive part comprising preferably thermoforming or injection molding the composition according to the invention as the first aspect or any of the embodiments thereof. The composition may be processed by any conventional processing technique known in the art into a shaped article. Suitable non-limiting examples include injection molding, rotational molding, compression molding, extrusion and extrusion compression molding. Please note that the embodiments disclosed above and below are also applicable to each of the other aspects.

Polypropylene: Manufacture

The heterophasic propylene copolymers that may be used in component (A) and component (B) can be produced using any conventional technique known to the skilled person, for example multistage process polymerization, such as bulk polymerization, gas phase polymerization, slurry polymerization, solution polymerization or any combinations thereof. The person skilled in the art is aware of what type of reactors are suitable for the preparation of heterophasic propylene copolymers. For example, Polyolefin Reaction Engineering by J. B. P. Soares and T. F. L. McKenna, July 2012 gives an overview of reactor and processes which are suitable for the production of polypropylene in Chapter 4. For example, the heterophasic propylene copolymer may be prepared in two stages using a first and a second gas-phase reactor, wherein in the first reactor the propylene and optional C3-C10 α-olefin are reacted to form the polypropylene matrix and wherein in the second reactor the polypropylene matrix and the ethylene are reacted with the C3-C10 α-olefin to form the heterophasic propylene copolymer. For example, the gas phase reactors are horizontal stirred gas-phase reactors.

Such polymerization processes are carried out by contacting the monomers with a catalyst, such as a metallocene or a Ziegler Natta type of catalyst. Ziegler Natta catalyst systems are known in the art and comprise a catalyst component, a co-catalyst component and an external donor. The catalyst component of the catalyst system primarily contains magnesium, titanium, halogen and an internal donor. Electron donors control the stereo specific properties and/or improve the activity of the catalyst system. A number of electron donors including ethers, esters, polysilanes, polysiloxanes, and alkoxysilanes are known in the art.

Heterophasic propylene copolymers suitable for use in the invention are known to the person skilled in the art and are commercially available from for example SABIC, Borealis, Total, etc.

Propylene-Based Matrix

The heterophasic propylene copolymer according to component (B) and optionally for component (A) comprises a propylene-based matrix consisting of a propylene homopolymer and/or a propylene-α-olefin copolymer, said propylene α-olefin copolymer consisting of at least 70 wt. %, preferably at least 90 wt. % of propylene and at most 30 wt. %, preferably at most 10 wt. % of α-olefin, based on the total weight of the propylene α-olefin copolymer. For the avoidance of doubt, the α-olefin, in the propylene α-olefin copolymer is a monomer other than propylene. Suitable α-olefins include ethylene, 1-butene, 1-pentene, 1-hexene, 1-heptene, 1-octene, 1-nonene, 1-decene and 4-methyl-1-pentene; ethylene being preferred in view of its availability and relative ease of manufacture.

Dispersed Ethylene-α-Olefin Copolymer

In addition to the propylene(s) at least one ethylene-α-olefin is present in the heterophasic propylene copolymer—according to component (B) and optionally for component (A)—as the dispersed rubber phase. The melt flow index of the ethylene-α-olefin copolymer is said to be "in accordance with ISO1133" for the reason that this melt flow index was calculated rather than actually measured. The calculation was carried out as follows:

$$\text{Log } MFI_{copol} = X_{matrix} * \text{Log}(MFI_{matrix}) + X_{disperse} * \text{Log}(MFI_{disperse})$$

wherein: $MFI_{copol}$=Melt flow index of the heterophasic propylene copolymer; $MFI_{matrix}$=Melt flow index of the matrix phase, i.e. the polypropylene; $MFI_{disperse}$=Melt flow index of the disperse to be calculated; and $X_{matrix}$ and $X_{disperse}$ represent the weight fractions of the matrix and disperse phase respectively.

Ethylene-Alpha (α)-Olefin Elastomer

The composition according to the present invention may further comprise from 0-30, preferably 0-20 wt. %, based on the weight of the composition, of an ethylene α-olefin elastomer (component (C)). Such ethylene α-olefin elastomer is preferably selected from one or more of ethylene-butene elastomer, ethylene-hexene elastomer and ethylene-octene elastomer. Even more preferably, the ethylene α-olefin elastomer is selected from one or more of a metallocene ethylene octene elastomer and a metallocene ethylene butene elastomer. Typically, these elastomers are added to further improve the impact resistance. The density of such elastomers may be from 860-885 kg/m³. The melt flow index for the elastomer may be from 0.10-10 g/10 min. Preferably, the composition according to the present invention comprises from 5-20 wt. %, or 7-18 wt. %, or 10-15 wt. % of elastomer. Elastomers which are suitable for use in the current invention are commercially available for example under the trademark EXACT™ available from Exxon Chemical Company of Houston, Tex. or under the trademark ENGAGE™ polymers, a line of metallocene catalyzed plastomers available from Dow Chemical Company of Midland, Mich. or Nexlene™ from SK Chemicals. Commercially available examples of suitable ethylene α-olefin elastomers are Tafmer DF605, Tafmer DF740, H5030S from Mitsui Chemicals America Inc., Engage 7447, Engage 8200, Engage 8207 from DOW, Exact 9371, Exact 9061 from Exxon, LC565, LC165, LC170 from LG, Fortify C5070D from SABIC.

Talc

Any type of talc that is suitable for the use as a filler may be used. As examples may be mentioned ultrafine talc (e.g. available as Ultra 5-HTP talc), micronized and finely ground talc (e.g. available as 00S D F or G); or High aspect ratio (HAR) talc which is known from U.S. Pat. No. 6,348,536 of Luzenac, which is incorporated by reference regarding the disclosure of the talc (e.g. available as Luzenac HAR® W92 and T84).

HPDE

Any suitable high density polyethylene (HDPE) may be used, e.g. an HDPE used in general injection molding applications. For example a HDPE having a MFR of between 5 and 15 g/10 min. In an embodiment, the density of HDPE is at least 960 gram/dm³. A commercial example is HS GC 7260 from LyondellBasell or M80064 from SABIC.

Additives

Optionally one or more additives may be present in the composition according to the present invention. Examples thereof are discussed below.

The composition may contain from 0-5 wt. %, preferably 0.1-5 wt. % of additives such as phenolic antioxidants, non-phenolic antioxidants, pigments, dyes, mold-release agents, nucleating agents, light (UV) stabilizers, antioxidants, acid scavengers, antistatic agents, lubricants, coupling agent, anti-scratch additives and the like. Obviously the additives may be a mixture of at least two of the foregoing additives. Preferred stabilizers include antioxidants, light (UV) stabilizers, and heat stabilizers. Suitable antioxidants are for example synthetic polyphenolic compounds such as tetrakis[methylene-3-(3',5'-di-t-butyl-4-hydroxyphenyl)propionate] methane;1,1,3-tris(2-methyl-4-hydroxy-5-t-butylphenyl)butane; 1,3,5-trimethyl-2,4,6-tris(3,5-di-t-butyl-4-hydroxybenzyl)benzene, bis(3,3-bis(4'-hydroxy-3'-t-butylphenyl)butanoic acid]-glycol ester; tris(3,5-di-t-butyl-4-hydroxy benzyl)isocyanurate; 1,3,5-tris(4-t-butyl-2,6-dimethyl-3-hydroxy-benzyl)isocyanurate; 5-di-t-butyl-4-hydroxy-hydrocinnamic acid triester with 1,3,5-tris(2-hydroxyethyl)-s-triazine-2,4,6(1H, 3H, 5H)-trione; p-cresol/dicyclopenta-diene butylated reaction product; 2,6-bis(2'-bis-hydroxy-3'-t-butyl-5'-methyl-phenyl-4-methyl-phenol).

As examples of phenolic additives may be mentioned octadecyl-3-(3,5-di-tert-butyl-4-hydroxyphenyl) propionate (SONGNOX® 1076 or Irganox® 1076 available from BASF), octyl-3-(3,5-di-t-butyl-4-hydroxyphenyl)propionate (Irganox® 1135 available from BASF tri-ethylene-glycol-bis-3-(t-butyl-4-hydoxy-5-methyl-phenyl)-propionate (Irganox® 245 from BASF), 1,6-hexane-diol-bis-3-(3,5-di-t-butyl-4-hydoxyphenyl)-propionate (Irganox® 259 from BASF), pentaerythritol tetrakis(3-(3,5-di-t-butyl-4-hydroxyphenyl)propionate (Irganox 1010 or Evernox 10 or Anox 20); 1,3,5-trimethyl-2,4,6-tris(3,5-di-t-butyl-4-hydroxybenzyl)benzene (Irganox® 1330 available from BASF), 1,1,3-tris-(2-methyl-4-hydroxy-5-t-butylphenyl)butane (Topanol® CA available from Vertellus Specialties), 1,3,5-tris(4-t-butyl-2,6-dimethyl-3-hydroxy-benzyl)-iso-cyanurate (Cyanox® 1790, available from Cytec). These phenolic antioxidants may also be used in mixtures with additional antioxidants, such as a combination of pentaerythritol tetrakis(3-(3,5-di-tert-butyl-4-hydroxyphenyl)propionate and tris(2,4-di-tert-butylphenyl)phosphite, which combination is commercially available under the tradename of Irganox B225 or Evernox B110 or Anox BB 011; each of these comprising 50 wt. % of each of the two components).

As examples of non-phenolic additives may be mentioned tris(2,4-di-tert-butylphenyl) phosphite (Irgafos 168 or as Everfos 168 or Alkanox 240), a thiosynergist such as di stearyl thio dipropionate (DSTDP). Suitable additional antioxidants are for example hindered amine stabilizers as are disclosed on columns 3-10 of U.S. Pat. No. 6,664,317 which section is incorporated by reference.

Examples of light (UV) stabilizers include benzophenone, benzotriazole and triazine type ultraviolet radiation absorbers, hindered hydroxyl-benzoates and hindered amine compounds. Examples of heat stabilizers include distearyl thio dipriorionate (DSTDP). The composition may also comprise acid scavengers for example calcium stearate or zinc stearate. Preferred pigments include titanium dioxide, ultramarine blue, iron oxide, carbon black, phthalocyanines, quinacridones, perylenes, nigrosine and anthraquinones. A commercially available example thereof is PLASBLAK PE4884. Preferred nucleating agents include sodium phenylphosphinate, calcium phenylphosphinate, aluminium oxide, silicon dioxide, and talc powder. Preferred antistatic agents are fatty acid esters ethoxylated alkylamines, diethanolamides, ethoxylated alcohols; commercially available examples thereof are Riken DMG-P(V) which is a distilled monoglyceride or Atmer 129 supplied by Croda Plastic Additives, which is a glycerol monostearate. Preferred lubricants and mold-release agents include ester waxes, pentaerythritol tetrastearate (PETS), long-chain fatty acids (preferably stearic acid or behenic acid) and esters or salts thereof (preferably calcium stearate or zinc stearate), and also amide derivatives (preferably ethylene bis stearamide or montan waxes), straight-chain, saturated carboxylic acids having chain lengths of 28-32 carbon atoms, and also low molecular weight polyethylene waxes or low molecular weight polypropylene waxes. Coupling agents are also called adhesion promoters. The adhesion promoter preferably comprises a modified (functionalized) polymer and optionally a low molecular weight compound having reactive polar groups. Preference is further given to modified polymers containing groups deriving from polar compounds, in particular one or more selected from the group consisting of acid anhydrides, carboxylic acids, carboxylic acid derivatives, primary and secondary amines, hydroxyl compounds, oxazoline and epoxides, and also ionic compounds. Specific examples of such polar compounds are unsaturated cyclic anhydrides and their aliphatic diesters, and the diacid derivatives thereof. In particular, one can use maleic anhydride and compounds selected from $C_1$-$C_{10}$ linear and branched dialkyl maleates, $C_1$-$C_{10}$ linear and branched dialkyl fumarates, itaconic anhydride, $C_1$-$C_{10}$ linear and branched itaconic acid dialkyl esters, maleic acid, fumaric acid, itaconic acid and mixtures thereof. A preferred adhesion promoter is a maleic anhydride functionalized polypropylene, such as a propylene polymer grafted with maleic anhydride. A commercially available example for a suitable adhesion promoter is Exxelor® PO1020 obtainable from ExxonMobil Chemical. Suitable examples of anti-scratch additives are erucamide, oleamide and polydimethylsiloxane.

For the avoidance of doubt it is noted that these additives are combined separately with the propylene-based matrix. However, the propylene-based matrix may already contain certain additives, in particular antioxidants as is known in the art per se.

In an embodiment, the comprising as additives a light stabilizer, an antistatic agent, a phenolic antioxidant and an anti-scratch agent.

Thermoplastic Composition-Parameters

The composition according to the present invention can be manufactured by melt blending the individual components according to any conventional procedure known in the art. Melt mixing devices suited for this process are discontinuous and continuous kneaders, twin screw extruders and single screw extruders with special mixing sections and co-kneaders. With melt-mixing is meant that the components are mixed with the heterophasic propylene copolymer at a temperature that exceeds the melting point of the heterophasic propylene copolymer. Melt-mixing may be done using techniques known to the skilled person, for example in an extruder. Generally, in the process of the invention, melt-mixing is performed at a temperature in the range from 20-260° C. Suitable conditions for melt-mixing, such as temperature, pressure, amount of shear, screw speed and screw design when an extruder is used are known to the skilled person. When using an extruder, a conventional extruder such as a twin-screw extruder may be used. The temperature can vary through the different zones of the extruder as required. For example, the temperature may vary from 180° C. in the feed zone to 260° C. at the die. Preferably, the temperature in the extruder varies from 200 to 260° C.

The invention relates to all possible combinations of features described herein, preferred in particular are those combinations of features that are present in the claims. It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps. The range of values "X to Y" or "X-Y" used herein is understood to mean "at least A and at most B". The invention is now elucidated by way of the following examples, without however being limited thereto.

Measurement Methods

Melt flow index: (MFI) unless explicitly stated otherwise herein, the melt flow index was measured according to ISO 1133 (2005) (2.16 kg, 230° C.). The unit of MFI is g/10 min. It should be noted that the Melt Flow Index (MFI) and the Melt Flow Rate (MFR) are used interchangeably.

The impact strength was determined by measuring the Izod impact strength determined according to ISO 180-1A (2000) [Test geometry: 65*12.7*3.2 mm, notch 45° according to ISO 37-2 (2011) in perpendicular orientation] at −20° C., 0° C. and 23° C.; P denotes partial breakage, B denotes complete breakage (brittle), T denotes no breakage (tough). The unit of the Izod impact strength is $kJ/m^2$.

The flexural modulus was determined according to ISO 178 (2010) at 23° C., the unit is $N/mm^2$ or MPa.

Scratch resistance was performed using Erichsen test, K59 texture. The VW scratch resistance test was measured according to the PV 3952 (2002) scratch method of Volkswagen AG company on an Erichsen scratching device, with a load of 10N. The resulting value dL is a measure for the scratch resistance, a low dL value corresponding to high scratch resistance; this means that the scratch does not turn white but keeps the original color of the scratched plaque. To fulfill this test requirement, dL should be lower than 1.5.

Intrinsic viscosity of the propylene polymer ($IV_{DP}$) and of the α-olefin copolymer ($IV_{EPR}$) were determined according to ISO-1628-1 (2009) and ISO-1628-3 (2010) based on the amounts of xylene-insoluble matter (CXI) and xylene-soluble matter (CXS) measured according to ISO 16152 (2005).

Tiger stripes are measured according to the following procedure. After molding, each of the specimens is visually observed for occurrence of tiger stripes on its smooth side and textured side. The quality of the surface is evaluated on a scale of 1 to 10, with 10 being the best, as described in Table below.

| | |
|---|---|
| 1 | very sharp transition between glossy and dull sections visible seen from any angle |
| 2 | sharp transitions between glossy and dull sections seen from any angle |
| 3 | very visible transitions between glossy and dull sections seen from any angle |
| 4 | visible transitions between glossy and dull sections seen from any angle |
| 5 | less visible transitions between glossy and dull sections seen from any angle |
| 6 | visible transitions between glossy and dull sections seen from a specific angle only |
| 7 | less visible transitions between glossy and dull sections seen from a specific angle only |
| 8 | no transitions between glossy and dull sections visible and surface appearance inhomogeneous |
| 9 | no transitions between glossy and dull sections visible and surface appearance homogeneous |
| 10 | no transitions between glossy and dull sections visible and surface is perfect |

The average tiger stripe rating is defined as the numerical average of the individual tiger stripe ratings for each of the test specimens manufactured at low, medium and high speed, manufactured with the pin-gate and the fan-gate and measured on the smooth and on the textured surface. Hence, the average tiger stripe rating as defined herein is the average of 12 individual tiger stripe measurements.

Charpy Impact strength was tested according to ISO 179-1eA (II) (2010) at 23° C. and −20° C. Specimen dimension was 80×10×4 mm and specimens were conditioned for a minimum of 48 h at 23±1° C. and at relative humidity of 50±5% before testing. The Charpy impact strength at −20° C. is preferably at least 3 kJ/m². The Charpy impact strength at 23° C. is preferably at least 10, preferably at least 20, preferably at least 40 kJ/m². P denotes partial breakage, B denotes complete breakage (brittle), T denotes no breakage (tough).

The tensile modulus is measured according to ISO 527-2(1A) (2012) at 1 mm/min at 23° C.

Mold shrinkage, in the context of this invention called shrinkage, is the amount of contraction that a molded part undergoes when it is removed from the mold cavity and cooled at room temperature. Shrinkage was measured according to ISO 294-4 (2001) on 65×65×3.2 mm injection molded plaques after a conditioning time of 24 h after molding at 23±1° C. and at relative humidity of 50±5% before testing. Each of the samples was molded using the same conditions at the molding machine. Shrinkage measured in the flow length and perpendicular to the flow is reported here. The following equation was used to determine shrinkage:

$$\frac{L_m - L_s}{L_m} \times 100 = \text{shrinkage } [\%]$$

wherein $L_m$ is the length of the mold in the considered direction, and $L_s$ is the length of the specimen in considered direction. A shrinkage in the flow direction, a shrinkage in the perpendicular direction to flow direction, as well as an average (arithmetic) of both shrinkage values is reported. The unit of the average shrinkage is percentage (%). The shrinkage is also measured after annealing, viz. after heating to a temperature of 90° C. for 1 hour. The unit of the average shrinkage after annealing is percentage (%). Warpage is determined by the same measurement method as shrinkage; it is a ratio. The warpage is also measured after annealing, viz. after heating to a temperature of 90° C. for 1 hour.

The automotive parts according to the invention can be a semi-finished or finished article made from the propylene-based matrix by a molding process, such as injection molding or blow molding. In an embodiment the composition may be shaped by means of extrusion so that the container, at least in part, is made by means of extrusion.

In a further aspect the present invention relates to a method for the manufacture of an automotive part as described herein comprising thermoforming or injection molding the composition as defined herein. In yet a further aspect the present invention relates to a composition as defined herein, preferably for the use for the manufacture of an automotive part.

Preferred embodiments of this invention are described herein. Variation of those preferred embodiments may become apparent to those of ordinary skill in the art upon reading the foregoing description. For the purpose of clarity and a concise description features are described herein as part of the same or separate embodiments. However, it will be appreciated that the scope of the invention may include embodiments having combinations of all or some of the features described. The invention will now be further illustrated by the following non-limiting examples.

EXAMPLES

In the experiments the following non-limiting materials were used. All of the heterophasic copolymers are reactor grade materials, i.e. are non-shifted or non-visbroken grades. All of the components are melt-mixed together to form a molding composition.

As available examples of suitable heterophasic propylene copolymers, the following may be mentioned.

PP01: this is a heterophasic propylene copolymer (HPC-D) commercially available from SABIC having a MFI of 70 g/10 min, a C2/C3 (viz. ethylene-propylene) rubber content (RC) of about 18 wt. % and a C2 content of the rubber phase (RCC2) of about 54 wt. %, and $IV_{EPR}/IV_{PP}$=1.62.

PP02: this is a heterophasic propylene copolymer commercially available from SABIC having a MFI of 33 g/10 min, a C2/C3 rubber content (RC) of about 18 wt. % and a C2 content of the rubber phase (RCC2) of about 54 wt. %.

PP03: this is a heterophasic propylene copolymer (HPC-A) having a rubber content (C2/C3 copolymer) of 20 wt. %, a MFI of 40 g/10 min and a C2 content of the rubber phase (RCC2) of 55 wt. %.

PP04: this is a heterophasic propylene copolymer (HPC-B) having a rubber content (C2/C3 copolymer) of 30 wt. %, and having a C2 content of the rubber phase (RCC2) of 50 wt. % and MFI of 14 g/10 min.

PP05: this is a heterophasic propylene copolymer (HPC-D) having a rubber content (C2/C3 copolymer) of 14 wt. %, and having a C2 content of the rubber phase (RCC2) of 46.4 wt. %, having a TC2 (=RC*RCC2) of 6.5 wt. % and said copolymer having MFI of 77 g/10 min, and $IV_{EPR}/IV_{PP}$=4.56.

PP06: this is a heterophasic propylene copolymer commercially available from SABIC having a MFI of 33 g/10 min, a C2/C3 rubber content (RC) of about 18 wt. % and a C2 content of the rubber phase (RCC2) of about 54 wt. %.

PP07: this is a homopropylene with a MFI of 44 g/10 min.

PP08: this is a heterophasic propylene copolymer commercially available from SABIC having a MFI of 5.5 g/10 min, a C2/C3 rubber content (RC) of about 33 wt. % and a C2 content of the rubber phase (RCC2) of about 20 wt. %.

Talc 1 is an ultrafine talc.

Talc 2 is a micronized and finely ground talc.

Talc 3 is a HAR talc.

Phenolic antioxidant (Phen. AO): octadecyl-3-(3,5-di-tert-butyl-4-hydroxyphenyl) propionate.

Phenolic antioxidant mixture (Phen. AO Mix): a mixture of 50 wt. % of pentaerythritol tetrakis(3-(3,5-di-tert-butyl-4-hydroxyphenyl)propionate and 50 wt. % of tris(2,4-di-tert-butylphenyl)phosphite.

As an adhesion promotor a maleic anhydride functionalized polypropylene is used.

As a heat stabilizer disteary thio diproprionate (DSTDP) is used.

As anti-scratch agents are used: erucamide (Anti-scratch 1) or oleamide (anti-scratch 2) or polydimethylsiloxane (anti-scratch 3).

As a light stabilizer a hindered amine (HALS) is used.

As antistatic agent a glycerol monostearate is used.

CMB is color master batch.

As the ethylene α-olefin elastomers are used: elastomer 1) being Ethylene based elastomer having a density of 0.861 g/cm³ and a MFI of 0.9 g/10 min (ASTM D1238, 2.16 kg, 190° C.); elastomer 2) being an polyolefin elastomer having a density of 0.870 g/cm³ and a MFI of 5 g/10 min (ASTM D1238, 2.16 kg, 190° C.).

In Table 1a below the examples are disclosed for both exterior and semi-exterior applications. In Table 2a the results are shown. In Table 1 b below the examples are disclosed for interior applications, such as instrument panels. In Table 2b the results are shown.

TABLE 1A

| Molding comp. (wt. %) | Comp. | CE | E1 | E2 | E3 | E4 | E5 |
|---|---|---|---|---|---|---|---|
| PP01 | A | 44.6 | 34.6 | 23.6 | 29.6 | 24.6 | 34.8 |
| PP05 | B | 20 | 30 | 40 | 36 | 41 | 30 |
| Elastomer 1 | C | 21 | 21 | 22 | 20 | 20 | 6 |
| Elastomer 2 | C | 0 | 0 | 0 | 0 | 0 | 14 |
| Talc 1 | D | 0 | 0 | 0 | 11 | 11 | 0 |
| Talc 2 | D | 12 | 12 | 12 | 0 | 0 | 12 |
| Phen. AO | F | 0.2 | 0.2 | 0.2 | 0.2 | 0.2 | 0.2 |
| Phen. AO mix | F | 0.2 | 0.2 | 0.2 | 0.2 | 0.2 | 0.2 |
| Antistatic agent | F | 0.1 | 0.1 | 0.1 | 0.1 | 0.1 | 0.0 |
| Heat stabilizer | F | 0.1 | 0.1 | 0.1 | 0.1 | 0.1 | 0.0 |
| Nucleating agent | F | 0.0 | 0.0 | 0.0 | 0.0 | 0.0 | 0.1 |
| Anti-scratch 1 | F | 0.0 | 0.0 | 0.0 | 0.0 | 0.0 | 0.5 |
| Anti-scratch 2 | F | 0.6 | 0.6 | 0.6 | 0.6 | 0.6 | 0.0 |
| Light stabilizer | F | 0.2 | 0.2 | 0.2 | 0.2 | 0.2 | 0.2 |
| CMB | F | 1 | 1 | 1 | 2 | 2 | 2 |
| Total | | 100 | 100 | 100 | 100 | 100 | 100 |

TABLE 1b

| | | Molding comp. (wt. %) | |
|---|---|---|---|
| | | Comp. | E6 |
| PP08 | | A | 15 |
| PP05 | | B | 58.6 |
| Elastomer 2 | | C | 10 |
| Talc 3 | | D | 11 |
| Phen. AO mix | | F | 0.2 |
| Adhesion promotor | | F | 1 |
| Nucleating agent | | F | 0.1 |
| Anti-scratch 3 | | F | 2 |
| Light stabilizer | | F | 0.1 |
| CMB | | F | 2 |
| Total | | | 100 |

TABLE 2A

| Features | CE1 | E1 | E2 | E3 | E4 | E5 |
|---|---|---|---|---|---|---|
| MFI | 26 | 26 | 25 | 29 | 29 | 32 |
| Izod strength at 23° C. | 49 T | 48 T | 49 T | 40 T | 34 T | 47 T |
| Charpy strength at 23° C. | 56 T | 51 T | 56 T | 43 B | 29 B | 55 T |
| Charpy strength at −20° C. | 11 B | 11 B | 11 B | 10 B | 10 B | 9 B |
| Flexural modulus | 1263 | 1280 | 1257 | 1282 | 1280 | 1352 |
| Tensile modulus | 1200 | 1175 | 1195 | 1150 | 1167 | 1353 |
| Av. shrinkage | 0.81 | 0.83 | 0.83 | 0.95 | 0.96 | 0.85 |
| Av. shrinkage after annealing | 0.89 | 0.92 | 0.92 | 1.10 | 1.11 | 0.97 |
| Warpage | 1.14 | 1.13 | 1.12 | 1.25 | 1.23 | 1.26 |
| Warpage after annealing | 1.16 | 1.15 | 1.15 | 1.25 | 1.24 | 1.28 |
| Tiger stripes | 6.2 | 6.7 | 7.6 | 8.0 | 8.2 | 7.6 |

TABLE 2b

| Features | E6 |
|---|---|
| MFI | 25 |
| Izod strength at 23° C. | 10 B |
| Flexural modulus | 1689 |
| Tensile modulus | 1661 |
| Average shrinkage | 1.03 |
| Average shrinkage after annealing | 1.19 |
| Warpage | 1.09 |
| Warpage after annealing | 1.10 |
| Scratch resistance | 0.43 |
| Tiger stripes | 8.4 |

From the above data it can be seen that the compositions according to the invention combine a good tiger stripe value of above 6.5 with good other properties, such as for example a good stretch resistance. In addition, the high flow of such compositions is good for injection molding. Hence one or more of the objects of the invention are accomplished by the invention as defined in the appending claims.

We claim:

1. A thermoplastic composition comprising:
   (A) from 10 to 69 wt. %, based on the weight of said composition one or more of a propylene homopolymer, a propylene copolymer, and a first heterophasic propylene copolymer;
   (B) at least 30 wt. %, based on the weight of said composition of a second heterophasic propylene copolymer comprising:
   * from 70 to 92 wt. % based on the weight of said heterophasic propylene copolymer of a propylene-based matrix consisting of a polypropylene polymer; wherein the polypropylene polymer has an intrinsic viscosity $IV_{PP}$;
   * from 8 to 30 wt. % based on the weight of said heterophasic propylene copolymer of a dispersed ethylene-α-olefin copolymer having an ethylene content of between 10 and 55 wt. % based on the weight of the ethylene-α-olefin copolymer and wherein the ethylene-α-olefin copolymer has an intrinsic viscosity $IV_{EPR}$; and
   wherein the ratio of $IV_{EPR}/IV_{PP}$ is between 3 and 7, wherein $IV_{PP}$ and $IV_{EPR}$ are determined according to ISO-1628-1 (2009) and ISO-1628-3 (2010) based on the amount of the xylene-soluble matter (CXS) and xylene-insoluble matter (CXI) measured according to ISO 16152 (2005);
   wherein the first heterophasic propylene copolymer is different from the second heterophasic propylene copolymer;
   C) from 0-30 wt. %, based on the weight of said composition of an ethylene-α-olefin elastomer comprising ethylene and a C3 to C10 α-olefin;
   D) from 1-30 wt. %, based on the weight of said composition of a talc;
   E) from 0-10 wt. %, based on the weight of said composition of a high-density polyethylene (HDPE);

F) from 0-5 wt. %, based on the weight of said composition of an additive.

2. The composition according to claim 1, wherein said composition comprises according to A) the first heterophasic propylene copolymer consisting of
   i) a propylene-based matrix consisting of a propylene homopolymer and/or a propylene-α-olefin copolymer, said propylene-α-olefin copolymer consisting of at least 70 wt. %, of propylene and at most 30 wt. %, of α-olefin, based on the total weight of the propylene-α-olefin copolymer, and
   ii) a dispersed ethylene-α-olefin copolymer comprising ethylene and a C3 to C10 α-olefin.

3. The composition according to claim 1, wherein said composition comprises according to A) the first heterophasic propylene copolymer consisting of:
   * from 70 to 90 wt. % based on the weight of the heterophasic propylene copolymer A-A of a polypropylene-based matrix consisting of a polypropylene having a melt flow index of from 55 to 85 g/10 min as measured according to ISO 1133 (2005) (2.16 kg and 230° C.); and
   * from 10 to 45 wt. % based on the weight of the heterophasic propylene copolymer A-A of a dispersed-ethylene-α-olefin copolymer having a melt flow index of from 2.5 to 5.0 g/10 min as measured according to ISO 1133 (2005) (2.16 kg and 230° C.);
   wherein the sum of the polypropylene-based matrix and the dispersed ethylene-α-olefin copolymer is 100 wt. %.

4. The composition according to claim 1, wherein said composition comprises according to A) the first heterophasic propylene copolymer consisting of:
   * from 60 to 85 wt. % based on the weight of the heterophasic propylene copolymer A-B of a polypropylene-based matrix consisting of a polypropylene having a melt flow index of from 50 to 100 g/10 min as measured according to ISO 1133 (2005) (2.16 kg and 230° C.); and
   * from 15 to 40 wt. % based on the weight of the heterophasic propylene copolymer A-B of a dispersed ethylene-α-olefin copolymer having a melt flow index of from 0.050 to 0.30 g/10 min as measured according to ISO 1133 (2005) (2.16 kg and 230° C.);
   wherein the sum of the polypropylene-based matrix and the dispersed ethylene-α-olefin copolymer is 100 wt. %.

5. The composition according to claim 1, wherein said composition comprises according to A):
   the first heterophasic propylene copolymer consisting of from 70 to 90 wt. % based on the weight of the heterophasic propylene copolymer A-A of a polypropylene-based matrix consisting of a polypropylene having a melt flow index of from 55 to 85 g/10 min as measured according to ISO 1133 (2005) (2.16 kg and 230° C.); and from 10 to 45 wt. % based on the weight of the heterophasic propylene copolymer A-A of a dispersed-ethylene-α-olefin copolymer having a melt flow index of from 2.5 to 5.0 g/10 min as measured according to ISO 1133 (2005) (2.16 kg and 230° C.); wherein the sum of the polypropylene-based matrix and the dispersed ethylene-α-olefin copolymer is 100 wt. %; and
   a third heterophasic propylene copolymer consisting of from 60 to 85 wt. % based on the weight of the heterophasic propylene copolymer A-B of a polypropylene-based matrix consisting of a polypropylene having a melt flow index of from 50 to 100 g/10 min as measured according to ISO 1133 (2005) (2.16 kg and 230° C.); and from 15 to 40 wt. % based on the weight of the heterophasic propylene copolymer A-B of a dispersed ethylene-α-olefin copolymer having a melt flow index of from 0.050 to 0.30 g/10 min as measured according to ISO 1133 (2005) (2.16 kg and 230° C.); wherein the sum of the polypropylene-based matrix and the dispersed ethylene-α-olefin copolymer is 100 wt. %;
   wherein a weight ratio of the first heterophasic propylene copolymer A-A to the second heterophasic propylene copolymer A-B is between 1:1 and 10:1.

6. The composition according to claim 1, wherein said composition comprises according to A) the first heterophasic propylene copolymer having a melt flow rate of at least 40 g/10 min as determined in accordance with ISO 1133 (2005) (230° C., 2.16 kg) and a FOG value of at most 500 μg/g, as determined by VDA 278 (2011).

7. The composition according to claim 1, wherein the composition has a melt flow index between 5 and 70 g/10 min, as determined in accordance with ISO 1133 (2005) (2.16 kg, 230° C.).

8. The composition according to claim 1, wherein the composition has a tensile modulus as measured in accordance with ISO 527-2(1A) (2012) at 23° C. of at least 1150 MPa.

9. The composition according to claim 1, wherein the combined amount of the one or more of a propylene homopolymer, a propylene copolymer, and a first heterophasic propylene copolymer of component (A) and the second heterophasic propylene copolymer of component (B) is at least 80 wt. % based on the weight of said composition.

10. The composition according to claim 1, wherein the composition has a flexural modulus measured according to ISO 178 (2010) at 23° C. of at least 1200 MPa.

11. The composition according to claim 1, comprising according to A) the first heterophasic propylene copolymer.

12. The composition according to claim 1, comprising according to A) more than one heterophasic propylene copolymer.

13. The composition according to claim 1, wherein the ratio of $IV_{EPR}/IV_{PP}$ is between 3 and 5.

14. An automotive part comprising the composition according to claim 1.

15. The automotive part according to claim 14, having a tiger stripe value of at least 6.5, wherein the tiger stripe value is measured according to the procedure wherein, after molding, each of the specimens is visually observed for occurrence of tiger stripes on its smooth side and textured side, and the quality of the surface is evaluated on a scale of 1 to 10, with 10 being the best.

16. The automotive part according to claim 15, wherein the tiger stripe value is at least 7.

17. The automotive part according to claim 14, said part being selected from the group consisted of a bumper fascia, a cowl top, an instrument panel, a pillar trim and a door panel.

18. A method for the manufacture of the automotive part of claim 14 comprising injection molding the composition.

19. A thermoplastic composition comprising:
   (A) from 10 to 69 wt. % based on the weight of said composition, one or more of a propylene homopolymer, a propylene copolymer, and a first heterophasic propylene copolymer;

(B) at least 30 wt. %, based on the weight of said composition of a second heterophasic propylene copolymer comprising:
- * from 70 to 92 wt. % based on the weight of said heterophasic propylene copolymer of a propylene-based matrix consisting of a polypropylene polymer; wherein the polypropylene polymer has an intrinsic viscosity IVPP;
- * from 8 to 30 wt. % based on the weight of said heterophasic propylene copolymer of a dispersed ethylene-α-olefin copolymer having an ethylene content of between 10 and 55 wt. % based on the weight of the ethylene-α-olefin copolymer and wherein the ethylene-α-olefin copolymer has an intrinsic viscosity IVEPR; and wherein the ratio of $IV_{EPR}/IV_{PP}$ is between 3 and 7, wherein $IV_{PP}$ and $IV_{EPR}$ are determined according to ISO-1628-1 (2009) and ISO-1628-3 (2010) based on the amount of the xylene-soluble matter (CXS) and xylene-insoluble matter (CXI) measured according to ISO 16152 (2005);

wherein, if the first heterophasic propylene copolymer is different from the second heterophasic propylene copolymer;

C) from 0-30 wt. %, based on the weight of said composition of an ethylene-α-olefin elastomer comprising ethylene and a C3 to C10 α-olefin;

D) from 1-30 wt. %, based on the weight of said composition of a talc;

E) from 0-10 wt. % based on the weight of said composition of a high-density polyethylene (HDPE);

F) from 0-5 wt. %, based on the weight of said composition of an additive, and wherein the composition has a melt flow index between 5 and 32 g/10 min, as determined in accordance with ISO 1133 (2005) (2.16 kg, 230° C.).

* * * * *